United States Patent Office 3,501,302

Patented Mar. 17, 1970

3,501,302

PHOTOSENSITIVE POLYACETYLENIC SYSTEM AND METHOD OF EXPOSURE

Rodger L. Foltz, Columbus, Ohio, assignor to The Battelle Development Corporation, Columbus, Ohio No Drawing. Filed June 6, 1966, Ser. No. 555,230

Int. Cl. G03c *1/72*

U.S. Cl. 96—88 13 Claims

ABSTRACT OF THE DISCLOSURE

Image-receptive elements with fixedly positioned photosensitive crystals of polyacetylenic compounds having at least two acetylenic linkages in a conjugated system. Radiant-energy exposure photographically providing a visual print-out image in part of exposed discrete portions of the crystals differing in color from discrete unexposed portions. Positive imaging employing crystals of an alkali metal salt of polyacetylenicdioic acid. Pressure imaging employing crystals of polyacetylenic hydrocarbon compound. Employing radiant-energy induced images for photocopying and also changing image color through heat or solvent for unexposed crystals.

DISCLOSURE

In general, this application concerns a photoinduced image and relates to print-out imaged elements comprising crystalline polyacetylenic compositions of matter and carrier means fixedly positioning the crystalline polyacetylenic compositions of matter. More particularly, the application relates to crystalline polyacetylenic compounds which undergo visible color changes, upon exposure to radiant energy. The application also includes a useful photosensitive image-receptive element comprised of photosensitive crystalline solid-state forms of polyacetylenic compounds, processes of image production, fixation, and conversion employing such photosensitive image-receptive element, and elements comprising images produced as a result of such processes.

Radiant energy, as used herein in regard to photosensitive crystalline polyacetylenic compositions of matter, is intended to include numerous variant forms of radiant energy encompassing not only the ultraviolet and visible regions (i.e., actinic radiation) and infrared region of the electromagnetic spectrum, but also electron beams such as developed by cathode ray guns, also gamma rays, X-rays, beta rays, electrical corona discharge, and other forms of corpuscular and/or wave-like energy generally deemed to be radiant energy. The various individual crystalline polyacetylenic compositions of concern generally are not responsive to all such forms of radiant energy, but selectively respond to at least one or more of the several variant forms of radiant energy. Within the numerous and varied useful crystalline polyacetylenic compositions of matter of concern, some respond rapidly and selectively to certain radiant energy forms and slowly or not at all to other forms of radiant energy while still others respond selectively to still other forms of radiant energy and not to other forms. Most frequently response to a particular form of radiant energy is greatest and most rapid at particular narrow regions and wavelengths of the electromagnetic spectrum, as will be apparent from what follows.

THE PRIOR ART

Polyacetylenic compositions of matter

Preparations of numerous and varied polyacetylenic compositions of matter are reported in literature along with some observations as to various polyacetylenic compounds being sensitive to light and/or ultraviolet to the extent that they undergo visible color changes. The most prolific investigators include: Artur Seher, Ferdinand Bohlmann and his coauthors, and E. R. H. Jones and M. C. Whiting and their coauthors. Illustrative of the numerous publications of the aforementioned and of other authors are: Fette und Seifen, 54 (1952), 544–9, 55 (1953), 95–7; Annalen Der Chemie, 543 (1940), 104–10, 589 (1954), 222–38; Chemische Berichte, 84 (1951), 785–794; 86 (1953), 657–67; 87 (1954), 712–724; 89 (1956), 1276–87; Angewandte Chemie, 65 (1953), 385–89; Arch. Pharm, 292 (1959), 519–28; Acta Chemica Scandinavica, 6 (1952), 893–90; J. Chemical Soc. (1952), 1993–2013 (1952), 2883–91 (1953), 1785–93 (1963), 2048–64 (1964), 1998; J. Am. Chem. Soc. (1957), 5817–20, 6263–67; Pure Appl. Chem., 2 (1961) 569–586; Proc. Chem. Soc., (June, 1960), 199–210; Russian Chemical Reviews (May 1963), 229–43. In the aforecited published articles and references mentioned therein, there are taught polyacetylenic compounds which in a crystalline form undergo visible color change upon exposure to radiant energy. These photosensitive polyacetylenic compounds contain a minimum of two acetylenic linkages as a conjugated system (i.e., —C≡C—≡C—) and, with only a few exceptions, carbon atoms in alpha positions to the acetylenic carbon atoms, i.e., those carbon atoms directly connecting to the acetylenic carbon atoms, are bonded directly only to carbon and/or hydrogen atoms. Such polyacetylenic compositions of matter encompass diynes, triynes, tetraynes, higher polyynes and numerous derivatives and related compounds thereof of various chemical classes ranging from hydrocarbon compounds to acids, to esters, to diols, to still other compounds of other chemical classifications containing numerous and varied organic radicals stemming from the conjugated acetylenic carbon atoms, all of which for purposes of this invention are termed polyacetylenic compositions of matter.

While the art of each of various classes of polyacetylenic compounds could warrant a summary, for sake of brevity and as an exemplary illustration of the known art there is included herein only brief summaries of that portion apparently most pertinent to the chemical classes termed dicarboxylic-terminated diacetylenic compounds and their ester derivatives.

Dicarboxylic-terminated diacetylenic compounds

The six-carbon member, or 2,4-hexadiynedioic acid, is reported by Bohlmann, Angewandte Chemie, 65 (1953), 385, as an intermediate product in preparation of a tetraynedioic acid. Seher, Fette u. Seifen, 54 (1954), 544, also reports the six-carbon diyne compound and notes that it transforms in a short time in light by the exposed side of the crystal becoming covered with a red layer. The ten-carbon acid member, or 4,6-decadiynedioic acid, is reported by Seher in the aforementioned reference of Fette u. Seifen, and in Annalen, 589 (1954), 222, along with such observations as becomes slowly red when heated at 130° C. and immediately red at room temperature under exposure to an ultraviolet lamp, and also goes to red upon warming. The twelve-carbon acid member, or 5,7-dodecadiynedioic acid, is noted also by Seher in the aforementioned Annalen reference as being obtained in two forms. The one form from quickly-cooled methanol solution is noted as colorless prisms which color rapidly under light to a reddish-violet and the other form from slowly-cooled methanol solution as needles which become blue on light exposure. The twenty-carbon and twenty-two carbon acid members, or 9,11-eicosadiynedioic acid and 10,12-docosadiynedioic acid, are reported by Black et al., J. Chem. Soc. (1953), 1787, 1790, 1791, as byproducts of coupling reactions. The twenty-carbon acid member also is reported by Seber in Fette u. Seifen, 55 (1953), 95, with a notation of turning a deep dark blue coloration upon light exposure.. The twenty-two carbon-acid member also is reported by Seher in Fette u. Seifen, 55 (1953), 95, and Annalen, 589 (1954), 222, with such observations as colors slowly in the dark and rapidly in the light to an intense dark blue and changes from the blue to red upon warming. In Fette u. Seifen, 54 (1952), 546, mention is made, while various diacetylenic derivatives are light-sensitive compounds, that such a light-sensitive property appears to be limited to those of the structure $$R-CH_2-C\equiv C-C\equiv C-CH_2-R$$

with the 2,4-hexadiynedioic acid being an exception to this generality.

Esters of dicarboxylic-terminated diacetylenic compounds

Several esters of dicarboxylic-terminated diacetylenic compounds are mentioned in literature. Christensen and Sorensen, Acta Chemica Scandinavica, 6 (1952), 893, in preparation of matricaria esters report the dimethyl ester of 3,5-octadiynedioic acid turns a beautiful violet-red on standing and that "The coloration accelerated in light, but some crystals remain colorless, so obviously some catalyzing impurities are co-responsible." There is no mention of a color change for the dimethyl ester of 4,6-decadiynedioic acid. Bohlmann et al. (Chem. Ber., 87 (1954) 712) also report preparation of the dimethyl ester of 3,5-octadiynedioic acid and note that its colorless needles are light sensitive by turning pink in a short time. This same observation is referred to by Seher, Ann., 589 (1954) 2264. Chem. Abstr., 54, 8624b, in reporting on Arch. Pharm., 292 (1959), 519–28, mentions dimethyl ester of 10,12-docosadiynedioic acid.

Photoinduced image and process

As exemplified by present knowledge relating to image-receptive elements comprising a silver halide, their exposure to radiant energy (such as ultraviolet and/or visible regions of the electromagnetic spectrum) results in formation of an invisible latent image. This image consists of sensitized crystals in a pattern of the discrete radiant energy striking the photosensitive silver halide. This latent image cannot be seen visually or examined directly, and in fact its very substance and existence can be demonstrated only by its behavior and amplification on development. Customarily for most applications the exposed element comprising a normal photographic emulsion is developed, fixed and washed to provide a useful visible silver image. However, there also are known "printing-out papers" and/or self-developing elements of the silver halide emulsion system wherein an image develops and prints out upon exposure. Such elements, providing directly developed silver images, result from the silver halide emulsion system containing appropriate constituents so that upon latent image formation the latent image is developed directly in situ to a visible silver image. Such printing-out papers then usually only are fixed and washed, although often toned before fixing.

As is apparent in the silver halide system, the principal photosensitive units are silver halide crystals bearing the latent image subsequently converted to a visible silver image. Development of the invisible latent image produces a visible silver image by a chemical alteration or reduction of the dispersed minute crystals or grains of the silver halide to silver particles comprising the visible image. For the most part each silver particle developed corresponds upon development to a single complete silver halide crystal or grain although in some instances several crystals are closely aggregated and develop together as aggregated silver particles. Thus in attempting to obtain high resolving power by the use of short wavelengths, when the wavelength is small compared to the crystal size, it is inherent in the silver halide system that the formed image pattern is limited in detail by the crystal size. These considerations apply when the wavelength of the employed radiation is small enough to permit observation of the grains or crystals of the photosensitive silver halide. No greater ultimate resolution and sharpness of detail of the discrete radiation pattern striking the same appears achievable in the silver halide system, because the whole crystal transposes to a silver particle on development of the exposed silver halide crystal. Presently extremely slow speed, so-called "grainless" or extremely fine-grained Lippman-type emulsions are available wherein the silver halide crystals are apparently less than the wavelength of visible light (i.e., frequently in the order of 100–1000 angstroms), although larger than the wavelength of the electrons of the conventional electron microscope beam. However, such Lippman-type emulsions are too slow for general utility.

The photosensitive material is of paramount importance in obtaining extreme resolution also in photosensitive systems other than the silver halide system. In some systems the sensitive material may well be lacking in discrete multimolecular structure and possibly is molecularly dispersed or dissolved in a matrix as the diazo-type, bichromated colloids, and silver albuminate systems. In these, the sensitive unit could be an individual molecule and the highest resolution thereby obtainable ultimately could be determined by the size of the individual molecules. Common to these systems, just as in the silver halide system, is a lack of a directly formed print-out visible image. A useful print-out image is obtained only after some sort of chemical or physical processing of the exposed element. Such a chemical or physical processing can be illustrated by the diazo process wherein unexposed diazo compounds are subsequently coupled to provide the colored image, by the blueprint process wherein a ferric salt is reduced to react with a ferricyanide to produce Turnbull's blue precipitate with unreduced ferric salt then subsequently washed out with water, by the photosensitive glass system wherein the exposed photosensitive glass is heated to develop the colored image, by the bichromated albumin process wherein the unexposed soluble portion is removed by immersion from the exposed now-insoluble imaged portion, and the like.

OBJECTS

Accordingly, in view of the state of the art it is an object to provide print-out visible images of extremely high resolution obtained directly by radiant energy exposure of a photosensitive element. It is another object to provide useful photosensitive elements comprising a photosensitive crystalline solid-state form of a polyacetylenic composition of matter. Additional objects are to provide processes of visual image production, fixation, and conversion of practical utility through employment of various image-receptive elements as taught in that description which follows. A further object is to provide unique print-out visible images of an extremely high resolution limited in extreme resolution primarily only by the discreteness of the radiant energy striking individual crystals of photosensitive crystalline polyacetylenic composition of matter in that the resultant print-out visible image comprises visible color-changed portions of crystals rather than an image of complete crystals or transformed complete crystals. Still a further object is to provide unique directly formed print-out visible images by a process involving a quantum yield greater than one. All the foregoing and other objects will be apparent from the following description.

THE INVENTION

Briefly and broadly invention resides in photosensitive image-receptive elements, formation of images, directly induced visual images, imaged elements, and certain photosensitive crystalline polyacetylenic compositions of matter and their preparation. The print-out imaged element is of extremely high resolution and sharpness of detail and comprises carrier means and, fixedly positioned thereby, a radiant energy-exposed photosensitive crystalline polyacetylene composition of matter. Significantly the unexposed photosensitive crystalline polyacetylenic composition of matter responds upon exposure to radiation with a quantum yield larger than unity to provide directly the print-out imaged element. The print-out imaged element presents a visual image of a color distinctly different than that of unexposed photosensitive crystalline polyacetylenic composition of matter with the visual image comprising a pattern, at least in part, of color-transformed portions of discrete whole crystals of the photosensitive crystalline polyacetylene composition of matter. Useful photosensitive image-receptive elements comprise carrier means and, fixedly positioned thereby, the photosensitive crystalline polyacetylenic compound. Processes of preparation and utilization of the photosensitive image-receptive elements are included. These processes encompass those for preparation of the image-receptive elements, for exposing the element to radiant energy, for fixing the print-out imaged elements so as to make nonexposed portions of the element at least substantially nonphotosensitive to that radiant energy by which the image was created, for converting the exposed color-transformed portions of whole crystals of the photo-sensitive polyacetylenic composition of matter to a different color, and processes of practical application of the imaged element in its unexposed, exposed, fixed, and converted embodiments.

GENERAL DESCRIPTION

Fundamental to functioning of the present invention are several important facets. One is that various forms of radiant energy selectively effect photosensitive crystalline polyacetylenic compositions of matter to provide directly formed visible color changes such that print-out images are recorded. Another is that the visible color change taking place upon exposure to radiant energy is discretely limited to that immediate portion of individual whole crystals of the photosensitive crystals of the polyacetylenic compounds contacted by discrete radiant energy. The extreme resolution of the created image is limited primarily only by the discreteness of the radiant energy striking the photosensitive crystals. Still another, for practical formation and employment of the highly resolved image, is that the unexposed and exposed photosensitive crystals of the polyacetylenic compositions of matter are fixedly positioned by a carrier means.

While not intending to be limited to any particular and specific theory, the following may assist one to understand and to practice the invention. Useful polyacetylenic compositions of matter for most practical photosensitive applications are in a solid-state form and in that crystalline solid-state form wherein adjacent molecules are oriented and structurally positioned in relation to each other in the crystal that irradiation induces polymerization. Upon interaction with a discrete unit of radiant energy, a photoinduced reaction takes place that involves several molecules. In a crystal composed of hundreds of photosensitive oriented molecules, interaction of a discrete unit of radiant energy provides a photochemical reaction with a visible color change of only a portion of such hundreds of orientated molecules and, has been observed for one polyyne to be in the average order of 8–16 molecules directly effected by each photon. The exposed color-changed crystal portion or initial photoproduct apparently has an unchanged empirical ratio of constituent elements and is of a higher molecular weight than a single unexposed molecule thus indicating a photopolymerization reaction having taken place. The initial photoproduct also exhibits some unusual and important properties. While the unexposed crystals of the photosensitive polyyne compound can range from colorless to white to light yellow under transmitted light, the initial photoproduct has a distinctly different color. It usually is an intense blue or purple or bluish-purple color, but has on occasion also carried a reddish-blue-purple coloration. Upon intensive radiation exposure a bronze metallic hue results. It appears to be stable to additional exposure of the same radiant energy which induced its formation. The initial photoproduct gives no detectable EPR (electron paramagnetic resonance) signal. Its color is apparently stable so long as the original polyyne crystal structure is maintained. Disruption of the crystal structure by heating or by contact with a solvent for the unexposed polyyne causes the initial photoproduct to transform or convert to still another colored material, a reddish material. This second product, a reddish material, in most cases, is relatively insoluble in organic solvents at about 20° C. and slightly soluble at elevated temperatures. In any particular solvent this second product generally is less soluble than its initial photosensitive form. The reddish product is thermochromic undergoing a reversible color change, usually to a bright yellow, over a range of elevated temperatures and becomes gummy at higher temperatures and darkens at still higher temperatures. Both the red and yellow products are piezochromic, becoming a dark blue when subjected to 10–20 kilobars pressure. A possible structure for this second polymeric product is that which contains repeating conjugated units having alternating olefinic and acetylenic linkages with nonacetylenic moieties from the initial polyyne structure found as side chain substituents and terminal groups of the repeating unit. It is relatively stable at ambient conditions and chemically very unreactive, but is decomposed by concentrated sulfuric acid and can be slowly hydrogenated over Raney nickel at elevated pressures and temperatures.

Numerous crystalline polyacetylenic compositions of matter are photosensitive and are of utility for the invention. Preferred photosensitive crystalline polyacetylenic compositions of matter and their preparation and application in the invention are taught herein. In addition, as will be noted from that literature already mentioned, and from what is disclosed and apparent therein and from other sources descriptive of polyacetylenic compositions of matter, there are numerous others known which are photosensitive: For some there exists a brief mention of their photosensitivity. However, after preparation of compositions of which uncertainty exists as to photosensitivity, it is within the skill of the art to determine their photosensitivity. Thus, with a particular application in mind, one needs merely to expose samples of prepared crystallne polyacetylenic composition of matters to the specific radiant energy to be employed in a particular application, desirably with employment of a perforated opaque mask or stencil to enable exposure of only a portion of the sample, and upon exposure to observe whether a visible color change occurs on the exposed portions to enable selection of a material of suitable photochemical response for the particular application. All crystalline polyacetylenic compositions of matter and forms thereof are not necessarily photosensitive and/or photosensitive to all forms of radiant energy. However, all those that are photosensitive are included within the invention. Those which are photosensitive vary in response to the variant forms of radiant energy and provide a wide latitude in choice of useful photosensitive polyacetylenic compositions of matter with some, of course, being of greater and lesser utility for specific applications. Broadly the invention encompasses employment of all crystalline polyacetylenic compositions of matter which are photosensitive to radiant energy. Characteristic of photosensitive crystalline polyacetylenic compositions of matter is their direct color transformation upon exposure to an effective form of radiant energy, with the color transformation such as to provide an image capable of direct print-out through employment of another form of radiant energy. Also characteristic of the photosensitive crystalline polyacetylenic compositions of matter is a discreteness of color transformation within photosensitive crystals exposed to radiant energy in that color transformation occurs only in limited portions of partially exposed whole photosensitive crystals. Due to the limited crystal portion which undergoes color transformation, i.e., that crystal portion and immediately surrounding portion of the crystal struck by the discrete radiant energy, extremely high resolution and sharpness of image are obtainable without any necessity of going to smaller size crystals and are especially observable in peripheral areas and lines of demarcation of imaged and nonimaged areas of an imaged element.

A number of methods are known to the art for preparation of polyacetylenic compositions of matter as apparent from the already mentioned literature references. Exemplary teachings of some methods are in U.S. Patents Nos. 2,816,149; 2,941,014; 3,065,283; etc. and exemplary journal teachings of methods are described in that literature already mentioned and in the references noted therein. One skilled in the art of organic chemical synthesis can readily choose a suitable preparation process for various desired polyacetylenic composition of matter, from known methods and obvious combinations and variations thereof. It is worthy of note that such general methods include: oxidative coupling or oxidative dehydrocondensation reactions of numerous terminal acetylenic compounds to prepare as desired, symmetrical and unsymmetrical polyyne compounds; dehydrohalogenation reactions to provide compounds containing acetylenic bonds; and variations, modifications and combinations of such two basic reactions to provide preparative routes for a multitude of different polyacetylenic compositions of matter and related derivatives. In some instances where specific functional groups are wanted on the desired polyacetylenic composition of matter, such functional groups are present in the terminal acetylenic reactants being coupled or in the compound being dehydrohalogenated, while in other instances different functional groups or "blocked" functional groups are present in the reacted components with subsequent conversion to the desired functional group after synthesis of the basic structure containing the desired polyacetylenic linkages. Well-known routes and methods for conversion of one functional group to another functional group are useful so long as the desired polyacetylenic linkage in the polyyne compound's structure are not adversely affected. More particulars and exemplary details of some preparations are found in specific examples which follow.

Of great importance and of particular preference for practice of the invention are photosensitive crystalline acid derivatives, and, in particular, certain esters and salts of dicarboxylic-terminated polyacetylenic compounds of the structural formula $$HOOC—(—CH_2—)_{m1}(—C\equiv C—)_n(—CH_2—)_{m2}—COOH$$

wherein $n$ is an integer of at least 2 and with especial preference for $n$ is 2, i.e., a diacetylenic compound, and $m1$ and $m2$ are integers, not necessarily the same but, by especial preference the same, greater than 5 and less than 10. The preferred photosensitive crystalline acid derivatives thereof include: the mono- and di-esters of these diacids and especially of the symmetrical diacetylenic diacids, with especial preference for the lower alkyl esters and most especially the lower alkyl ester derivatives wherein the alkyl-ester moiety contains less than 3 carbon atoms and most especially only 1 carbon atom; and alkali metal salts and acid derivatives of these diacids and their half esters with especial preference for the potassium salt of the methyl half-ester of the especially preferred symmetrical diacetylenic diacids. Included within the suitable photosensitive crystalline materials and exemplary thereof are: dimethyl ester of 11,13-tetracosadiynedioic acid; dimethyl ester of 4,6-decadiynedioic acid; diethyl ester of 11,13-tetracosadiynedioic acid, dibenzyl ester of 10,12-docosadiynedioic acid, dimethyl ester of 7,9-hexadecadiynedioic acid; dicyclohexyl ester of 10,12-docosadiynedioic acid; dimethyl ester of 9,11-eicosadiynedioic acid, monomethyl ester of 4,6-decadiynedioic acid; monocyclohexyl ester of 10,12-docosadiynedioic acid; monobenzyl ester of 10,12-docosadiynedioic acid; monoethyl ester of 11,13-tetracosadiynedioic acid; monomethyl ester of 10,12-docosadiynedioic acid; monoethyl ester of 10,12-docosadiynedioic acid; monomethyl ester of 11,13-tetracosadiynedioic acid; mononeopentyl ester of 10,12-docosadiynedioic acid; methyl potassium 10,12-docosadiynedioate; methyl potassium 7,9-hexadecadiynedioate; methyl barium 4,6-decadiynedioate; dipotassium 7,9-hexadecediynedioate; dipotassium 10,12-docosadiynedioate; 10,12-docosadiynedichloride; 10,12-docosadiynedibromide; 10,12-docosadiynedinitrile.

Other polyacetylenic compositions of matter in crystalline form also are photosensitive and of utility for the invention. Illustrative thereof are: 2,4-hexadiyne; 7,9-hexadecadiyne; 9,11-eicosadiyne; 11-13-tetracosadiyne; 12,14-hexacosadiyne; 11,13-hexacosadiyne; 17,19-hexatriacontadiyne; 4,6-decadiynedioic acid; 7,9-hexadecadiynedioic acid; 9,11-eicosadiynedioic acid; 10,12-docosadiynedioic acid; 11,13-tetracosadiynedioic acid; 12,14-hexacosadiynedioic acid; 12,14-octacosadiynedioic acid; 17-octadecene-9,11-diynoic acid, 2,4-hexadiynediol; 3,5-octadiynediol; 10,12-docosadiynediol; 11,13-tetracosadiynediol; the ditoluene-p-sulphonate of 2,4-hexadiynediol; 2,4,6-octatriyne; 2,4,6,8-decatetraynediol; 3,5,7,9-dodecatetrayne; 1,8,10,16-octadecatetrayne; 9,11,13,15 - tetracosatetrayne; 1,6,8,13-tetradecatetrayne; 1,8,10,17-octadecatetrayne.

Each polyacetylenic compound in the foregoing tabulations, upon preparation in a reasonably pure, suitable crystalline state, exhibits at least some photosensitivity to at least one form of radiant energy. While specific preparations of some are described later by way of specific examples, each are prepared by processes within the skill of the art by making use of teachings found herein and in literature. In those instances where the polyacetylenic compound is a liquid at normal temperatures, the compound is cooled to a temperature wherat a suitable crystalline state is obtained and then exposed to the radiant energy while in this crystalline state. Of course, the speed of response and the color change induced by the radiant energy vary widely among the foregoing tabulated polyynes. For some the color change upon exposure is almost instantaneous, i.e., within a fraction of a second, while for others several hours or days of exposure are needed to provide a significant visible color change. For some the color change is quite striking such as from a clear or white to a deep or intense purple or a vivid red, while for others the change is rather drab, such as from a clear or white to a brown, or dark brown, or a black. Apparently the number of acetylenic linkages in the polyyne compound influence the particular color change with diynes going to blue, or purple, or reds and triynes, tetraynes, and higher polyynes going to browns and blacks. Thus, depending on particular requirements for a desired application, such as temperature of use, radiant energy form employed, desired speed of response, desired color of image, and the like, there is available a wide selection of useful photosensitive crystalline polyacetylenic compositions of matter.

In addition to the foregoing tabulated useful photosensitive crystalline polyacetylenic compositions of matter, one also can synthesize other polyacetylenic compounds and then determine, as aforedescribed, whether the same are photosensitive and possessed of adequate photosensitivity for the application in mind. Some additional polyyne compounds reportedly possessing some photosensitivity are described in the literature. Such polyyne compounds can be prepared as described by the literature and their photosensitivity then evaluated to determine whether suitable for the desired application. Exemplary of these reported compounds are:

1,7,9,15-hexadecatetrayne;
1,5,7,11-dodecatetrayne;
1,9,11,19-eicosatetrayne;
2,4,6,8,10-dodecapentayne;
1,3,5,7,9-tridecapentayne;
2,4,6,8,10,12-tetradecahexayne;
1,3,5,7,9,11,13,15-hexadecaoctayne;
1,6,8,13,15,20,22,27-octacosaoctayne;
1,9,11,19,21,29,31,39-tetracontaoctayne;
dimethylester of 3,5-octadiynedioic acid;
4-pentynyl ester of 10,12-tridecadiynedioic acid;
ichthyothereol acetate, isanolic acid;
2,4-hexadiynedioic acid;
5,7-dodecadiynedioic acid;
1,8-dichloro-2,4,6-octatriyne;
1,10-dichloro-2,4,6,8-decatetrayne;
3,5-octadiyne-2,7-diol;
2,4,6-octatriyne-1,8-diol;
1,3,5-nonatriyne-8,9-diol;
4,6,8-nonatriyne-1,2-diol;
trans-2,3-epoxynona-4,6,8-triyne-1-ol;
trans-nona-2-ene-4,6,8-triyne-1-ol;
4,6-decadiyne-1,10-diol;
4,6,8-decatriyne-1,2-diol;
2,4,6,8-decatetrayne-1,10-diol;
3,5,7,9-dodecatetrayne-2,11-diol;
2,13-dimethyl-3,5,7,9,11-tetracosapentayne-2,13-diol;
5,7,9,11-hexadecatetrayne-4,13-diol.
diurethane of 4,6-decadiyne-1,10-diol.

The specificity of the examples and embodiments, for which descriptions follow, is for illustrative purposes only and it is not intended by these examples to limit the invention to other than its true scope.

EXAMPLE A

Dimethyl ester of 10,12-docosadiynedioic acid

Two hundred grams of a commercially available 10-undecynoic acid is heated in 600 ml. of boron trichloridemethanol solution (10% w./v.) to 60° C. Ten minutes after the solution becomes clear it is poured into one liter of ice water and extracted with three-400 ml. portions of petroleum ether (B.R. 30°–60° C.). The combined petroleum ether extracts are washed with two-200 ml. portions of water and dried over magnesium sulfate. Filtration and removal of the petroleum ether under reduced pressure yields 213 grams of the colorless liquid, methyl 10-undecynoate, B.P. 106–7° C. at 2.5 mm. Hg.

Into a 5 liter, three-neck flask are placed 20 grams of cuprous chloride, 24 grams N,N,N',N'-tetramethylethylenediamine (TMEDA), 2400 ml. of methanol and the 213 grams of the afore-prepared methyl 10-undecynoate. The reaction mixture is stirred vigorously while oxygen is bubbled therethrough. The temperature of the reaction mixture is maintained below 45° C. by occasional cooling with an ice-bath during the first hour of the reaction. After approximately 12 hours, the stirring and oxygen flow are discontinued and the methanol removed using a rotary evaporator and reduced pressure. The residue is extracted with four-300 ml. portions of petroleum ether (B.R. 30°–60° C.) and the resulting bluish solution washed with five-100 ml. portions of an aqueous 4% hydrochloric acid solution and followed by washing with two-200 ml. portions of water. The resulting colorless petroleum ether solution is dried over magnesium sulfate. The magnesium sulfate is removed by filtration and the filtrate concentrated to about 800 ml. and cooled. The resulting white crystalline product is collected by filtration and dried, yielding 185 grams of dimethylester of 10,12-docosadiynedioic acid, M.P. 41–42° C.

N.M.R. spectrum:

$C\underline{H}_3O-\overset{O}{\overset{\|}{C}}-$ 220 c.p.s., singlet (6.1)

$-C\underline{H}_2\overset{O}{\overset{\|}{C}}-O-$ and $-C\underline{H}_2-C\equiv C-$ 136 c.p.s., multiplet (7.8)

$-\overset{|}{\underset{|}{C}}-C\underline{H}_2-\overset{|}{\underset{|}{C}}-$ 80 c.p.s., broad singlet (24)

(In this example and other examples, which follow, the nuclear magnetic resonance (N.M.R.) spectra are obtained on a Varian Associates HR–60 spectrometer in deuteriochloroform solution. Chemical shifts are reported in cycles per second downfield from the internal standard tetramehtyl silane at 60 mc./sec. The number in parenthesis is the relative area of the resonance.)

EXAMPLE B

Dimethyl ester of 11,13-tetracosadiynedioic acid

A mixture of 100 grams of a commercially available lithium acetyl ethylene diamine complex and 400 ml. of dimethyl sulfoxide is stirred in a dry one-liter flask under an atmosphere of dry nitrogen. After one hour, 40 grams of omega-bromodecanoic acid dissolved in 100 ml. of dimethyl sulfoxide are added dropwise into the one-liter flask while maintaining the temperature of the reaction mixture to below 35° C. by means of an ice bath. Upon completion of the addition, stirring is continued and the temperature held at 32° to 36° C. for approximately 14 hours. The resulting dark-colored reaction mixture is cooled to 10° C., acidifed with aqueous 6 N HCl and extracted with three-300 ml. portions of ether. The combined ether extracts are washed with aqueous 1 N HCl, water, and aqueous saturated sodium chloride solution and then dried over magnesium sulfate and activated charcoal. After filtering, the ether is removed under reduced pressure and the resulting syrupy liquid crystallized from petroleum ether (B.R. 30°–60° C.). The product is distilled under vacuum and the fraction collected between 155°–161° C. at 1 mm. of mercury pressure is recrystallized from petroleum ether (B.R. 30°–60° C.). The yield is 20 grams of 11-dodecynoic acid, M.P. 44°–46° C. Small portions of unreacted omega-bromodecanoic acid, 10-dodecynoic acid and 11-docosaynedioic acid are also identifiable in the product.

Twenty grams of the aforeprepared 11-dodecynoic acid product are dissolved in 100 ml. of boron trichloride-methanol solution (10% w./v.) and the solution heated to 60° C. After 10 minutes the solution is poured into 200 ml. of ice water and extracted with three-50 ml. portions of petroleum ether (B.R. 30°–60° C.). The combined extracts are washed with water and dried over magnesium sulfate. Filtration and removal of the solvent yields 10 grams of a colorless liquid, methyl 11-dodecynoate, B.P. 49–50° C. at 0.3 mm. Hg pressure.

Oxygen is bubbled through a stirred mixture of 3 grams of methyl 11-dodecynoate, 0.4 gram of cuprous chloride, and 0.5 gram of tetramethylethylene diamine in 60 ml. of isopropyl alcohol maintained at 40° C. for 14 hours. The alcohol is removed under reduced pressure and the residue triturated with ether and filtered. The filtrate is treated with activated charcoal to remove remaining color and then cooled. The resulting crystalline product is collected by filtration and dried, yielding 2.8 grams of dimethyl ester of 11,13-tetracosadiynedioic acid, M.P. 39.5°–40.5° C.

N.M.R. spectrum:

$C\underline{H}_3O\overset{O}{\overset{\|}{C}}-$ 220 c.p.s., singlet (5.8)

$-C\underline{H}_2\overset{O}{\overset{\|}{C}}-O-$ and $-C\underline{H}_2-C\equiv C-$ 136 c.p.s., multiplet (8.0)

$-\overset{|}{\underset{|}{C}}-C\underline{H}_2-\overset{|}{\underset{|}{C}}-$ 77 c.p.s., broad singlet (28)

EXAMPLE C

Dimethyl ester of 4,6-decadiynedioic acid 4,6-decadiynedioic acid is prepared by the method of Arthur Seher (Annalen, 589, p. 234 (1954)). A solution of 6 grams of the aforeprepared 4,6-decadiyndioic acid in 50 ml. of boron trichloride, methanol solution (10% w./v.) is boiled for 15 minutes and poured into ice water, filtered and washed with cold water. The solid diester is dissolved in ether, washed successively with water, dilute sodium carbonate, and water and then dried over magnesium sulfate. Evaporation of the solvent yields 6.1 grams of the dimethylester of 4,6-decadiynedioic acid which, after recrystallization from petroleum ether (B.R. 60°–110° C.), melts at 34°–35° C.

N.M.R. spectrum:

$C\underline{H}_3O\overset{O}{\overset{\|}{C}}-$ 219 c.p.s., singlet (6.0)

$-C\underline{H}_2\overset{O}{\overset{\|}{C}}-O-$ and $-C\underline{H}_2-C\equiv C-$ 151 singlet (8.0)

EXAMPLE D

Dimethyl ester of 7,9-hexadecadiynedioic acid 8.6 grams of 7,9-hexadecadiynedioic acid is dissolved in 25 ml. of boron trichloride-methanol solution (10% w./v.). The reaction mixture is refluxed for 20 minutes and then poured into ice water and extracted with pertoleum ether (B.R. 30°–60° C.). The etheral extract is washed with water, dried over magnesium sulfate and filtered. Upon evaporation of the ether there is obtained 9.4 grams of an oil of crude dimethyl ester of 7,9-hexadecadiynedioic acid, which may be used for the preparation of the monomethyl ester of 7,9-hexadecadiynedioic acid and methyl potassium 7,9-hexadecadiynedioate.

EXAMPLE E

Diethyl ester of 11,13-tetracosadiynedioic acid

Fifty grams of 11-dodecynoic acid are dissolved in 165 ml. of boron trichloride-ethanol solution (10% w./v.). After boiling the solution for ½ hour, it is poured into 700 ml. of ice and water and extracted with 200 ml. of petroleum ether (B.R. 60°–110° C.). The petroleum ether solution is dried over magnesium sulfate. Removal of the solvent under reduced pressure yields 55.7 grams of a colorless oil, crude ethyl 11-dodecynoate, which is not further purified, but is used directly in an oxidation coupling reaction for preparation of diethyl ester of 11,13-tetracosadiynedioic acid.

Oxygen is bubbled through a stirred mixture of 4.0 grams cuprous chloride, 4.8 grams ethylenediamine and 600 ml. of ethanol for a period of 15 minutes. The aforeprepared crude ethyl 11-dodecynoate (55.7 grams) then is added while maintaining the stirring and with oxygen bubbling. The temperature of the reaction mixture is kept below 45° C. by means of an ice bath. After 6 hours the ethanol is stripped off under reduced pressure using a rotary evaporator. The residue is extracted with 1500 ml. of petroleum ether (B.R. 60°–110° C.). The petroleum ether solution is washed with three-100 ml. portions of aqueous 4% hydrochloric acid followed by two-200 ml. portions of water and dried over magnesium sulfate. After removing the magnesium sulfate by filtration, the petroleum ether solution is reduced in volume to about 150 ml. by vacuum stripping and cooled to −20° C. Colorless crystals, which form in the petroleum ether solution, are removed by filtration and dried, to yield 42.8 grams of diethyl ester of 11,13-tetracosadiynedioic acid, M.P. 29–30° C.

N.M.R. spectrum:

$C\underline{H}-$ 75 c.p.s., triplet*

$-C\underline{H}_2O\overset{O}{\overset{\|}{C}}-$ 248 c.p.s., quartet (3.9)

$-C\underline{H}_2\overset{O}{\overset{\|}{C}}-O-$ and $-C\underline{H}_2-C\equiv C-$ 134 c.p.s., multiplet (8.3)

$-\overset{|}{\underset{|}{C}}-C\underline{H}_2-\overset{|}{C}-$ 78 c.p.s., broad singlet (3)

* integral included in $-\overset{|}{\underset{|}{C}}-C\underline{H}_2-\overset{|}{\underset{|}{C}}-$ value because of peak overlap.

EXAMPLE F

Dicyclohexyl ester of 10,12-docosadiynedioic acid

A solution of 25 grams of 10,12-docosadiynedioic acid and 1 gram of p-toluene sulfonic acid in 100 grams cyclohexanol is agitated at 100°–110° C. for about 20 hours and left to stand at room temperature for about 72 hours. The solvent is removed by distillation and the residue dissolved in ether and washed successively with water, aqueous 2% potassium hydroxide, and water. After drying over magnesium sulfate and filtering, the ether is removed by distillation. The residual product is recrystallized twice from petroleum ether (B.R. 30°–60° C.) once from petroleum ether (B.R. 60°–110° C.). The yield is 18 grams, M.P. 39°–40° C.

N.M.R. spectrum:

$-C\underline{H}_2\overset{O}{\overset{\|}{C}}-O-$ and $-C\underline{H}_2-C\equiv C-$ 134 c.p.s., multiplet (8.1)

$-C-C\underline{H}_2-C-$ and cyclohexyl$-C\underline{H}_2-$ 70 c.p.s., broad singlet (43.9)

cyclohexyl$\overset{|}{\underset{|}{C}}\underline{H}O-\overset{O}{\overset{\|}{C}}-$ 284 c.p.s., broad singlet (2.0)

EXAMPLE G

Dibenzyl ester of 10,12-docosadiynedioic acid

A solution of 6 grams of 10,12-docosadiynedioic acid and 1 gram p-toluene sulfonic acid in 100 grams of benzyl alcohol is agitated at 102° C. for 18 hours. The solvent is removed by distillation under reduced pressure and the residue extracted with hot petroleum ether (B.R. 60°–110° C.). The extract is washed with aqueous 2% potassium hydroxide and then with water, dried over magnesium sulfate, filtered and the solvent is removed by distillation at reduced pressure. The residue is crystallized twice from petroleum ether (B.R. 60°–110° C.) and afforded 4.2 grams of the desired product, M.P. 40°–41° C.

N.M.R. spectrum:

$-C\underline{H}_2\overset{O}{\overset{\|}{C}}-O-$ and $-C\underline{H}_2-C\equiv C-$ 133 c.p.s., multiplet (8.2)

$-\overset{|}{\underset{|}{C}}-C\underline{H}_2-\overset{|}{\underset{|}{C}}-$ 78 c.p.s., broad singlet (24.0)

$-\overset{O}{\overset{\|}{C}}-O-C\underline{H}_2-O$ 306 c.p.s., singlet (4.0)

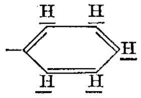
441 c.p.s., singlet (9.5)

EXAMPLE H

Monomethyl ester of 4,6-decadiynedioic acid

A solution of 21 grams of dimethyl ester of 4,6-decadiynedioic acid in 100 grams 0.93 N barium hydroxide in absolute methanol is stirred at 40° C. for 19 hours. The precipitate is filtered, washed with methanol and dispersed in approximately equal volumes of chloroform-aqueous 4% hydrochloric acid for about 5 minutes, and filtered. The solid is again dispersed as above and filtered. Both filtrates are combined, the water layer discarded and the organic phase washed with water until neutral, and dried over magnesium sulfate. The solvent is removed by distillation under reduced pressure and the residue recrystallized from a mixture of chloroform and petroleum ether (B.R. 60°–110° C.) to give 11 grams of product, M.P. 103°–104.5° C.

N.M.R. spectrum:

$\underline{H}_3$ $C\underline{H}_3OC(=O)—$ 215 c.p.s., singlet (3.3)

$—C\underline{H}_2C(=O)—O—$ and $—C\underline{H}_2—C{\equiv}C—$ 148 c.p.s., doublet (7.6)

$—C(=O)—O\underline{H}$ 720 c.p.s., broad singlet (1.0)

EXAMPLE I

Monocyclohexyl ester of 10,12-docosadiynedioic acid

A solution of 9.2 grams 10,12-docosadiynedioic acid, 13.3 grams of dicyclohexyl ester of 10,12-docosadiynedioic acid, and 1 gram p-toluene sulfonic acid in 300 grams of dimethyl sulfoxide is agitated for 18 hours at 100°–105° C. and then for 24 hours at about 20° C. The reaction mixture is poured into water and filtered. The filtrate is extracted with ether, the solution dried over magnesium sulfate and the solvent removed under reduced pressure. The residue is combined with the solid from the original filtrate and freed from the diacid by stirring with hot petroleum ether (B.R. 30°–60° C.) and filtering. The filtrate then is extracted with aqueous 2% potassium hydroxide to separate the diester from monoester of the diacid. The basic solution is acidified with aqueous 10% hydrochloric acid, and the monoester of the diacid is extracted with chloroform to give 6.0 grams, which on recrystallization from petroleum ether (B.R. 60°–110° C.) melts at 52°–53° C.

N.M.R. spectrum:

$—C\underline{H}_2—C(=O)—O—$ and $—C\underline{H}_2—C{\equiv}C—$ 133 c.p.s., multiplet (7.7)

$—C—C\underline{H}_2—C—$ and cyclohexyl$—C\underline{H}_2—$ 79 c.p.s., broad singlet (33.6)

cyclohexyl $C\underline{H}O—C(=O)—$ 285 c.p.s., broad singlet (1.4)

$—C(=O)—O\underline{H}$ 550 c.p.s., broad singlet (1.4)

EXAMPLE J

Monobenzyl ester of 10,12-docosadiynedioic acid

A solution of 37.7 grams of 10,12-docosadiynedioic acid and 100 grams of thionyl chloride is refluxed for 1 hour and then unreacted thionyl chloride removed by distillation. The residue is dissolved in chloroform, washed with water, filtered and dried over magnesium sulfate. Distillation of the solvent yields 33.7 grams of an oil. The infrared spectrum displays no adsorption in the 3.0μ region, which is consistent with 10,12-docosadiyne-1,22-dioyldichloride.

A solution of 4 grams of the 10,12-docosadiyne-1,22-dioyldichloride, 6 grams of benzyl alcohol and 25 grams of pyridine is agitated at about 20° C. for 18 hours, poured into water, and extracted with ether. The ether solution is washed successively with water, dilute hydrochloric acid and water, dried with magnesium sulfate and the solvent removed under reduced pressure. The residue is extracted by stirring with hot petroleum ether (B.R. 60°–110° C.). Partial distillation of the solvent and chilling results in tan colored crystals forming. Two more crystallizations afford 1.8 grams of the monobenzyl ester, M.P. 54–56° C. (An anticipated dibenzyl ester is not obtained in this preparation.)

N.M.R. spectrum:

$—C\underline{H}_2C(=O)—O—$ and $—C\underline{H}_2—C{\equiv}C—$ 133 c.p.s., multiplet $—C—CH_2—C—$ 79 c.p.s., broad singlet $—C(=O)—O—C\underline{H}_2—$ 306 c.p.s., singlet $—C(=O)—O\underline{H}$ 525 c.p.s., broad singlet

EXAMPLE K

Mononeopentyl ester of 10,12-docosadiynedioic acid

A solution of 20 grams 10,12-docosadiynedioic acid and one gram p-toluenesulfonic acid in 50 grams of neopentyl alcohol is agitated for 17 hours at 107°–118° C., diluted with petroleum ether (B.R. 30°–60° C.) and washed with water. About 3 grams of a solid appears at the interphase and is separated by filtration and identified as crude starting material by infrared spectrum and M.P. 104°–117° C. The organic phase is washed with aqueous 2% potassium hydroxide, acidified with dilute hydrochloric acid and extracted with petroleum ether (B.R. 30°–60° C.). After drying with magnesium sulfate, the petroleum ether is concentrated to a small volume and chilled. The resulting precipitate therein is twice recrystallized from petroleum ether (B.R. 30°–60° C.) to yield 0.15 gram of the mononeopentyl ester. The material retained in the organic phase after washing with aqueous 2% potassium hydroxide is heated to remove the solvent and there also is obtained 21 grams of crude dineopentyl ester which could not be crystallized.

N.M.R. spectrum:

$C\underline{H}_3—$ 55 c.p.s., singlet (8.7)

$—C\underline{H}_2OC(=O)—$ 225 c.p.s., singlet (2.0)

$—C\underline{H}_2C(=O)—O—$ and $—C\underline{H}_2—C{\equiv}C—$ 135 c.p.s., multiplet (3.9)

$—C—C\underline{H}_2—C—$ 79 c.p.s., broad singlet (12.5)

EXAMPLE L

Monoethyl ester of 11,13-tetracosadiynedioic acid

Forty-two grams of the diethyl ester of 11,13-tetracosadiynedioic acid, 450 ml. of 0.206 N barium hydroxide-ethanol solution, and 300 ml. of absolute ethanol are placed in a 1-liter flask containing a glass-coated magnetic stirring bar and equipped with a drying tube containing a sodium hydroxide-asbestos absorbent for carbon dioxide. The solution is stirred at about 20° C. for 5 days. The ethanol then is removed under reduced pressure and the residue extracted with ether until unreacted diethyl ester (about 17 grams) is removed. The remaining residue in acidified with aqueous 4% HCl and the resulting mixture extracted with ether, the ether extract washed with water and dried over magnesium sulfate. The ether is removed under reduced pressure and the resulting residue crystallized from petroleum ether (B.R. 30°–60° C.) to yield 20 grams of monoethpl ester of 11,13-tetracosadiynedioic acid, M.P. 60°–61° C.

N.M.R. spectrum:

$C\underline{H}_3-$ 74 c.p.s., triplet*

$-C\underline{H}_2OC(=O)-$ 248 c.p.s., quartet (2.4)

$-C\underline{H}_2C(=O)-O-$ and $-C\underline{H}_2-C\equiv C-$ 134 c.p.s., multiplet (8.2)

$-\overset{|}{\underset{|}{C}}-C\underline{H}_2-\overset{|}{\underset{|}{C}}-$ 78 c.p.s., broad singlet (31)

$-C(=O)O\underline{H}$ 533 c.p.s., broad singlet (1.3)

* Integral included in $-\overset{|}{\underset{|}{C}}-C\underline{H}_2-\overset{|}{\underset{|}{C}}-$ value because of peak overlap.

EXAMPLE M

Monomethyl ester of 11,13-tetracosadiynedioic acid

Forty grams of the dimethyl ester of 11,13-tetracosadiynedioic acid are dissolved in 60 ml. of methanol and poured into a one-liter flask containing a glass-coated magnetic stirring bar and stoppered with a drying tube containing a sodium hydroxide-asbestos absorbent for carbon dioxide. To the stirring solution there is added 97 ml. of 0.928 N barium hydroxide-methanol solution. Stirring is continued at room temperature for 20 hours. The precipitated barium salt of the monoester is removed by filtration and washed with petroleum ether (B.R. 60°–110° C.). The white solid is triturated in 500 ml. of ether and 200 ml. of aqueous 5% HCl until all solid dissolves. The ether layer is washed with water until neutral and dried over magnesium sulfate. The ether is removed under reduced pressure and the residue recrystallized from petroleum ether (B.R. 30°–60° C.) to yield 20 grams of monomethyl ester of 11,13-tetracosadiynedioic acid, M.P. 71°–72° C.

N.M.R. spectrum:

$C\underline{H}_3OC(=O)-$ 219 c.p.s., singlet (2.9)

$-C\underline{H}_2C(=O)-O-$ and $-C\underline{H}_2-C\equiv C-$ 135 c.p.s., multiplet (8.0)

$-\overset{|}{\underset{|}{C}}-C\underline{H}_2-\overset{|}{\underset{|}{C}}-$ 77 c.p.s., broad singlet (28)

$-C(=O)O\underline{H}$ 536 c.p.s., broad singlet (1.2)

EXAMPLE N

Monomethyl ester of 10,12-docosadiynedioic acid

Two liters of methanol are poured into a 5-liter flask followed by 185 grams of the dimethyl ester of 10,12-docosadiynedioic acid. The mixture is stirred until the diester dissolves. To the resulting solution are added 509 ml. of 0.928 N barium hydroxide-methanol solution. The reaction mixture is stirred at room temperature for 24 hours. The precipitated barium salt is removed by filtration and washed with methanol. The methanol filtrates are concentrated and filtered until no further barium salt can be obtained. The barium salt is triturated under 500 ml. of 1 N HCl and the resulting mixture extracted with three-300 ml. portions of ether. The combined ether extracts are washed with 200 ml. of water and dried over magnesium sulfate. After removal of the magnesium sulfate by filtration and the ether by reduced pressure distillation, the resulting solid is recrystallized from petroleum ether (B.R. 30°–60° C.). The crystalline product is collected by filtration, washed with cold petroleum ether and dried. A conversion to 118 grams of monomethyl ester of 10,12-docosadiynedioic acid, M.P. 61°–62° C., is obtained.

N.M.R. spectrum:

$C\underline{H}_3OC(=O)-$ 220 c.p.s., singlet (3.1)

$-C\underline{H}_2C(=O)-O-$ and $-C\underline{H}_2-C\equiv C-$ 137 c.p.s., multiplet (7.9)

$-\overset{|}{\underset{|}{C}}-C\underline{H}_2-\overset{|}{\underset{|}{C}}-$ 80 c.p.s., broad singlet (24)

$-C(=O)O\underline{H}$ 619 c.p.s., broad singlet (1.1)

In addition, 18 grams of unsaponified dimethyl ester and 8 grams of the diacid are isolated and recovered.

The infrared spectra (Perkin-Elmer 521 spectrometer) of the diyne diester and half-ester products of the preceding examples are consistent with the expected absorption bands. All obtained UV spectra (Carey Model 14M) show the uniquely characteristic absorption of the diyne group ($-C\equiv C-C\equiv C-$) with maxima at 215, 225, 240 ($\epsilon\sim380$) and 254 m$\mu$ ($\epsilon\sim230$).

EXAMPLE O

Methyl potassium 10,12-docosadiynedioate

To monomethyl ester of 10,12-docosadiynedioic acid of an acid number of 150 to 160, which had been prepared from its corresponding diester by a hydrolysis technique, there is added aqueous potassium hydroxide in the amount calculated to neutralize the half-ester constituent. The resulting clear solution is filtered. The filtered solution now containing methyl potassium 10,12-docosadiynedioate, is evaporated to substantial dryness on a paper. Upon drying, crystalline methyl potassium 10,12-docosadiynedioate is precipitated onto the surface of the paper and this crystalline methyl potassium 10,12-docosadiynedioate undergoes a visible color change upon exposure to ultraviolet radiation.

EXAMPLE P

11,13-tetracosadiyne

About 1.25 moles of bromine are added dropwise to a cooled solution of about 1.13 moles of 1-dodecene in one liter of carbon disulfide. After all the bromine is added, there is added 1-dodecene in the small amount sufficient to remove the red color from the slight bromine excess. The carbon disulfide is removed by distillation and the remaining yellow liquid is taken up in ether, washed with aqueous 10% ethanol and dried over magnesium sulfate. The ether is removed by distillation and the remaining, about 1 mole, of crude 1,2-dibromodecane used for dehydrobromination. This crude, 1,2-dibromodecane is mixed with 5.3 moles of potassium hydroxide in aqueous solution and under a nitrogen atmosphere heated to 170°–200° C. for 3 hours. The first half-hour of heating is under reflux, while during the latter 2½ hours there is collected about 200 ml. of a condensate, a cloudy colorless liquid. Ether and water are added to the distillate and, after thorough mixing, the ether layer is separated and dried over sodium sulfate. The dried ether solution then is stripped of ether and followed by a vacuum distillation with a 19.4 grams fraction collected between 43°–50° C. at 0.5 mm. Hg pressure and a 68.3 grams fraction collected between 49°–62° C. at 0.6–1.2 mm. Hg pressure, each fraction being identified by infrared techniques to be crude 1-dodecyne.

Two grams of cuprous chloride and 2.4 grams of N,N,N',N'-tetramethylethylene-diamine are mixed with 400 ml. of isopropanol and oxygen bubbled through the stirred mixture for 15 minutes. Whereupon about 24 grams of crude 1-dodecyne are added. The stirring and bubbling addition of oxygen are continued for 14 hours with the reactant mixture at 35° C. and then for 19½ hours with the reactant mixture at about 50° C. At this time the isopropanol is stripped off under vacuum at 40°–50° C. The remaining material then repeatedly is mixed with 200 ml. aliquots of petroleum ether (B.R. 30°–60° C.) which successively are filtered therefrom until a colorless filtrate is obtained. The filtrates are combined and washed several times with aqueous 10% hydrochloric acid. The washed petroleum ether solution then is vacuum stripped of petroleum ether to leave a slightly yellow liquid product. This product is mixed with ether and permitted to stand 16 hours at about 0° C. A crystalline material, which formed in the ether solution, is separated by a rapid filtration of the cold solution, dried under magnesium sulfate, and found to weigh 19.4 grams. The ether filtrate is concentrated by vacuum stripping and is filtered, to obtain a second crop of precipitated crystalline material, weighing about 7.1 grams after drying under magnesium sulfate. The total yield obtained is 26.5 grams of 11,13-tetracosadiyne.

Each crystalline polyacetylenic compound for which a specific example of preparation already has been presented herein is photosensitive in that upon exposure to at least one form of radiant energy, particularly ultraviolet radiation of a wavelength predominantly about 2537 A., it will undergo a visible color change. A semiquantitative determination and comparison of the photosensitive response of various prepared crystalline polyacetylenic compounds of the specific examples can be made as follows: The polyacetylenic compound in an organic solvent is flowed onto a white surface, such as that of a white filter paper or white filing card, and solvent evaporated to leave an adhered deposit of the crystalline polyacetylenic compound. The deposited crystalline polyyne compound then is exposed to radiant energy. For evaluation there is employed a Mineralite short wave, ultraviolet lamp of a peak wavelength emission of 2537 A. At a distance of 57 cm. and after an exposure of 30 sec. to the lamp, the deposit on a white filing card of crystalline monomethyl ester of 10,12-docosadiynedioic acid (preparation described in Example N) changes visually from a white color to a purple-blue closely approximating under the Munsell notation 7.5 PF 4/2. If one chooses this color as a standard for comparison, one can place deposits of other crystalline polyyne compounds on other white filing cards and by exposing to the same lamp at a distance of 57 cm. irradiate the deposits for that exposure time needed to visually closely approximate a color match of the color of the chosen standard. By such a procedure the ultraviolet photosensitivity of a number of the crystalline polyyne compounds, whose preparations are described in specific examples, are determined with the following being a tabulation of illustrative findings made:

| Crystalline polyyne compound | | UV exposure time (seconds)* to reach a color approximating Munsell 7.5 PB 4/2 |
|---|---|---|
| Example | Name | |
| N | Monomethyl ester of 10,12-docosadiynedioic acid. | 30 |
| M | Monomethyl ester of 11,13-tetracosadiynedioic acid. | 80 |
| B | Dimethyl ester of 11,13-tetracosadiynedioic acid. | 180(a) |
| L | Monoethyl ester of 11,13-tetracosadiynediodic. acid. | 120(b) |
| J | Monobenzyl ester of 10,12-docosadiynedioic acid. | 600 |
| I | Monocyclohexyl ester of 10,12-docosadiynedioic acid. | 420 |
| K | Monoeopentyl ester of 10,12-docosadiynedioic acid. | about 900(b) |
| F | Dicyclohexyl ester of 10,12-docosadiynedioic acid. | 195 |

*For any particular polyyne, the sensitivity may be varied considerably from these values by varying purity, crystal size, crystal form, and the like of the crystalline polyyne compound.

(a) and (b)—Difficult to determine the exposure time for an approximate color match with exactness in that the resulting (a) photoproduct is somewhat greenish-blue and the resulting (b) photoproducts have a somewhat different purplish appearance than the standard purple-blue color. Some other photoproducts, not specifically marked with a subscript, also upon irradiation only approximately match the standard Munsell 7.5 PB 4/2 color in that the presence of some minute red and yellow photoproducts therein are noted.

In practice of the invention there is employed a photosensitive image-receptive element comprising a carrier means which serves to position fixedly crystals of the photosensitive crystalline polyacetylenic composition of matter. The carrier means functions to hold individual crystals in fixed position in relation to other crystals so the element, unexposed and exposed, can be handled and moved without displacement and change in positions of crystals with respect to each other. Thus, the element can be moved, rotated, turned over, lifted, and subjected to like physical handling, and, because of the carrier means as a component thereof, be of practical utility for many diverse image-recording applications. In contrast, were a carrier means not included as a component of the image-receptive element, as if one were to use a loose mass or layer of photosensitive crystals, then almost any slight movement of the exposed element, and even a slight air current, could disturb and displace crystals from their original position with a resultant image on the exposed element becoming distorted and deformed and not a true image. Such an element devoid of carrier means would lack any substantial practical utility for image-recording purposes.

The carrier means can be in any of several diverse embodiments so long as it functions to hold individual crystals substantially in fixed position in relation to other crystals. Generally and preferably the carrier means comprise a binder material, such as a natural or synthetic plastic, resin, colloid or gel and the like wherein the crystals of the photosensitive crystalline polyacetylenic composition of matter are dispersed therein and held in fixed position thereby. In such instances the polyyne composition is mixed as a dope, solution, emulsion, dispersion or the like with the binder material and then processed to provide solid films, sheets, coatings and the like containing dispersed crystals of the photosensitive crystalline polyacetylenic composition of matter. Thus, one embodiment of the image-receptive element is a solid sheet, film, or the like comprising a binder material as a dispersing medium to position fixedly therein dispersed crystals of the photosensitive crystalline polyacetylenic composition. Another embodiment of the element is a substrate material or body to which adheres a film, coating, or the like of the binder material having the dispersed crystals therein. Useful substrate materials include paper sheet, glass sheet, plastic film, and other conventional and suitable photographic quality substrate materials. Still an additional embodiment of the element can comprise the substrate material having adhered thereto a binder-free coating of crystals of the photosensitive crystalline polyacetylenic composition of matter. Other element embodiments, as desired, can include a coating of a suitable quality photographic coating material on one or more surfaces and interfaces of the various element embodiments. In addition other element embodiments can comprise the polyyne crystals and a support means of any of various combinations of the several foregoing components and still other components apparent to those in the art, so long as the carrier means fixedly positions the photosensitive crystalline polyacetylenic composition.

Exemplary substrate materials of utility as components for the carrier means include: vitreous materials, such as glass, glazed ceramics, porcelain, etc.; fibrous materials such as cardboard, fiberboard, paper including bond paper, resin and clay-sized papers, wax or other transparentized paper, paperboard, etc., cloths and fabrics including those of silk, cotton, viscose rayon, etc.; metals, such as copper, bronze, aluminum, tin, etc.; natural polymers and colloids, such as gelatin, polysaccharides; natural and synthetic waxes including paraffin, beeswax, carnauba wax; synthetic resins and plastics, including particularly polyethylene, polypropylene, polymers and copolymers of vinylidene and vinyl monomers including polyvinyl chloride, polyvinylidene chloride, vinyl chloride/vinyl acetate, vinyl acetate/acrylate, vinyl acetate/methacrylate, vinylidene chloride/acrylonitrile, vinylidene chloride/vinyl acetate, vinylidene chloride/methacrylate, polystyrenes, polyvinyl acetals including polyvinyl butyral, polyvinyl formal, polyvinyl alcohol, polyamides including polyhexamethylene adipamides, N-methoxymethyl polyhexamethylene adipamide, natural and synthetic rubbers including butadiene-acrylonitrile copolymers, 2 - chloro - 1,3 - butadiene polymers, polyacrylate polymers and copolymers including polymethylmethacrylate, polyethylmethacrylate, polyurethanes, polycarbonates, polyethylene terephthalate, polyethylene terephthalate/isophthalate copolymers and other esters as by condensing terephthalic acid and its derivatives with propylene glycol, diethylene glycol, tetramethylene glycol or cyclohexane - 1,4 - dimethanol, cellulose ethers including methyl cellulose, ethyl cellulose and benzyl cellulose, cellulose esters and mixed esters including cellulose acetate, cellulose triacetate, cellulose propionate, cellulose nitrate and cellulose diacetate; and even nonthermoplastic materials including cellulose, phenolic resins, melamine-formaldehyde resins, alkyd resins, thermosetting acrylic resins, expoxy resins, and numerous other synthetic resins and plastics as will be apparent to those skilled in the art.

The base or substrate material may be transparent, translucent or opaque to the particular radiant energy to which the employed photosensitive crystalline polyacetylene compound is sensitive. It is selected with due consideration of the intended usage of the imaged element and of the specific radiant energy and technique to be employed in the particular image-recording application. For example, where the imaging technique requires transmission of ultraviolet radiant energy through the substrate material to expose the polyacetylenic crystals, the substrate should possess such a transmission characteristic and may be a cellulose acetate butyrate, cellulose acetate, polyvinyl alcohol, polyvinyl butyral or other suitable transparency. The base or substrate material may be adhered directly to the binder-free or binder-dispersed photosensitive crystals, or indirectly adhered, if desired, by a subbing layer or coating on the substrate material for any of several purposes, e.g., to alter the substrate transmission of the radiant energy, to change the substrate's reflectivity of the radiant energy, to modify adherence to the substrate material and for other reasons. Similar to the base or substrate material, such subbing layer is selected with due regard to the specific radiant energy and technique to be employed in the particular image-recording application. Subbing layers for various photographic purposes and methods of coating substrate materials with the same are well known.

Generally and preferably the element, whether comprised of binder-dispersed crystals or comprised of substrate material and binder-free crystals or binder-dispersed crystals, is a flat film, sheet, plate or the like so as to present a flat surface upon which the radiant energy may be directed. However, curved-surfaced and other than flat-surfaced elements, although generally of lesser utility, are not excluded.

Exemplary binder materials of utility as components for the carrier means include: natural and synthetic plastics, resins, waxes, colloids, gels and the like including gelatins, desirably photographic-grade gelatin various polysaccharides including dextran, dextrin, hydrophyllic cellulose ethers and esters, acetylated starches, natural and synthetic waxes including paraffin, beeswax, polyvinyllactams, polymers of acrylic and methacrylic esters and amides, hydroylzed interpolymers of vinyl acetate and unsaturated addition polymerizable compounds such as maleic anhydride, acrylic and methyacrylic esters and styrene, vinyl acetate polymers and copolymers and their derivatives including completely and partially hydrolyzed products thereof, polyvinyl acetate, polyvinyl alcohol, polyethylene oxide polymers, polyvinylpyrrolidine, polyvinyl acetals including polyvinyl acetaldehyde acetal, polyvinyl butyraldehyde acetal, polyvinyl sodium-o-sulfobenzaldehyde acetal, polyvinyl formaldehyde acetal, and numerous other known photographic binder materials including a substantial number of aforelisted useful plastic and resinous substrate materials which are capable of being placed in the form of a dope, solution, dispersion, gel, or the like for incorporation therein of the photosensitive polyacetylenic composition and then capable of processing to a solid form containing dispersed crystals of the photosensitive crystalline polyacetylenic composition of matter. As is well known in the art in the preparation of smooth uniform continuous coatings of binder materials, there may be empolyed therewith small amounts of conventional coating aids as viscosity controlling agents, leveling agents, dispersing agents, and the like. The particular binder material employed is selected with due regard to the specific radiant energy and technique to be employed in the particular image-recording application and invariably is a binder material permitting substantial transmission of that specific radiant energy to be employed. Desirably, the binder material is a nonsolvent, or possesses only limited solvating properties, for the photosensitive polyyne so that the polynne is capable of existence in its crystalline form therein.

Well-known sources, lenses and optical systems, camera arrangements, focusing and projection systems and the like for the various forms of radiant energy are used in employing the image-receptive element in the varied image-forming applications, such as specimen photography, pattern making, reproduction of written, printed, drawn, typed, and the like matter, and the recording of line graphical images by an impinging pointed beam of the radiant energy on the element with either or both the element and pointed beam guided or traveling to trace the image. The resultant images are directly formed printout images in that they can be seen by the human eye to be a visibly distinctly different color than unirradiated crystals of the element.

The photosensitive image-receptive element may be used in image-forming systems based on transmission-exposure techniques and reflex-exposure techniques. Thus, stencils of a material substantially nontransmissive of the radiant energy may be laid on the image-forming element with the cut-out portion of the stencil allowing the applied radiant energy to strike the element according to the desired image or images. If desired, the stencil need not contact the element with the radiant energy being projected to pass through the cut-out portion of the stencil to strike the element. The element also can be exposed by contact or projection techniques through a two-tone image or process transparency, e.g., a process negative or positive (i.e., an image-bearing transparency consisting of areas transmissive and opaque to the radiant energy such as of a so-called line or halftone negative or positive-type transparency) or a continuous tone negative or positive. Likewise an object, whose image is to be obtained, may be placed between the radiant energy source and the element and the radiant energy striking the element will be of an image pattern dependent on the radiant energy absorption and transmission characteristics of the particular object. Reflex-exposure techniques are applicable. For example, by ultraviolet reflecting optic techniques, the ultraviolet sensitive image-receptive elements may be used to make photocopies of printed or typed copy. Reflex-exposure techniques are particularly useful for making office copies from materials having messages on both sides of a page, for making images, of specimens and objects, and for reproducing messages and the like found on materials not having radiant energy transmissive properties conducive to transmission-exposure techniques.

EXAMPLE 1

A small amount of a 11,13-tetracosadiynedoic acid product, containing about 20 to 30 percent of monoethyl ester of 11,13-tetracosadiynedioic acid, this product of a M.P. 118° C., is dissolved in alcohol and stirred vigorously into aqueous polyvinyl alcohol. There results a suspension of finely divided crystals in aqueous polyvinyl alcohol. When this suspension is flowed and/or spread on any of several base or substrate materials, for example a sheet of white paper, and dried by warming slightly to evaporate water and alcohol from the wet coating, there is provided an element comprising the paper substrate material having adhered thereto a polyvinyl alcohol binder containing dispersed therein colorless crystals of the diyne-diacid product. Upon exposure of such a prepared element to ultraviolet radiation, from a source of a principal wavelength emission of 2537 A., the irradiated diyne-diacid product changes to a deep blue to purple-colored product, and upon lengthy irradiation to a bronze color which appears to be stable in the absence of additional ultraviolet irradiation and temperatures below 50° C. By heating the exposed element to a temperature above about 120° C., the blue-bronze colored product is changed to a red product. Alternatively the blue-to-bronze product can be transformed to the red product by exposing to warm ethanol vapors, usually for about 5 minutes.

When a fine-mesh metallic screen is laid upon a like prepared element and this arrangement exposed to the ultraviolet radiation, there is produced a colored negative image of the screen on the exposed element. This colored negative image then can be converted to a red negative image by heating the exposed element to a temperature above about 120° C. This heating to above 120° C. and conversion of the blue to red image also can result in clarification of unexposed portions of the element.

EXAMPLE 2

A small amount of 11,13-tetracosadiynedioic acid product, containing some monoethyl ester of 11,13-tetracosadiynedioic acid, this product of a M.P. about 118° C., is dissolved in ethanol, or acetone, if desired, and the solution added to aqueous polyvinyl alcohol. The resulting dispersion is milled with glass beads until a fineness of grind of 7 (North Shore Gage) is obtained. The dispersion then is coated by a knifeblade technique on a glass microscope slide and the water and alcohol evaporated from the wet coating by drying the slide in an air oven at about 50° C. The resulting element comprises a glass substrate material having adhered thereto a smooth solid film about ½ mil thick of polyvinyl alcohol-binder containing dispersed therein colorless crystals of the diyne-diacid product.

The resulting element then is employed as the photosensitive image-recording element in electron microscopy in place of a conventionally employed element comprising a glass plate having a silver-halide-gelatin emulsion thereon. The electron microscope used is a Model 6A, manufactured by Japan Electron Optics Company, utilizing a hot tungsten cathode electron source with a 80 kilovolts accelerating potential and a beam current of 60–80 $\mu$a. on a wire screen specimen for 2500–4500× instrument magnification and an exposure time of 10–15 seconds. Upon removal of the exposed element from the electron microscope, it is found to show a visible blue-colored electron microscopic negative image of the specimen.

EXAMPLE 3

A 7,9-hexadecadiynedioic acid product of a melting point of 117°–119° C. containing some monomethyl ester of 7,9-hexadecadiynedioic acid, is jet-pulverized to an average particle size of 5–10 microns. The resulting powder then is dispersed by milling with glass beads to approximate 10 percent solids in aqueous polyvinyl alcohol. From the resulting dispersion there is prepared, substantially as described in the preceding example, an element comprising a glass substrate material having adhered thereto a smooth solid film of polyvinyl alcohol binder containing dispersed therein white crystals. This element, like that of the preceding example, is employed in electron microscopy with a longer exposure time being desirable. The exposed element also is found to record a visible blue-colored negative image of the specimen.

The blue-colored image on the exposed element is reversibly converted to a red image by heating to between 50–60° C. with this red image returning to a blue image upon cooling to below 50° C. However, upon heating the image to about 100° C. the blue image changes to a red image which red-colored image persists even upon cooling the image to 20–50° C.

EXAMPLE 4

Monomethyl ester of 10,12-docosadiynedioic acid of a M.P. 60° C. is heated to slightly above its melting point and added dropwise slowly to rapidly stirred warm aqueous polyvinyl alcohol. Upon cooling there results small particles of the diyne-diacid monoester dispersed or emulsified in the aqueous polyvinyl alcohol. This then is applied as wet films to the surface of glass sheets and dried slowly and carefully to provide an element comprising a glass substrate material having adhered thereto a smooth solid film of polyvinyl alcohol binder containing white crystalline monoester dispersed therein as small crystals in the order of about 10 micron size. During drying of the wet films there is a tendency of the wet film to pull away or crawl from the edges of the glass sheet so as to cover and adhere to only a portion of the glass surface. Addition of small amounts of glycols and/or additional polyvinyl alcohol and ethanol to the applied dispersion decreases such "crawl" of the films and likewise a suitable subbing layer on the glass substrate also can diminish such crawl. The resulting element is capable of recording an immediately visible image when employed in an electron microscope as described in preceding examples.

EXAMPLE 5

Monomethyl ester of 11,13-tetracosadiynedioic acid of a M.P. of 71° C. is employed in place of the monoester of the preceding example to prepare a similar image-recording element. This element is capable of recording an immediately visible image when employed in an electron microscope as described in the preceding examples.

EXAMPLE 6

Monomethyl ester of 10,12-docosadiynedioic acid is pulverized to a fine particle size and then stirred into aqueous hydroxyethyl cellulose. The resulting dispersion is applied as a coating to glass microscope slides and water evaporated from the wet coatings. The resulting element comprises a glass substrate material having adhered thereto a solid film of the hydroxyethyl cellulose containing dispersed therein fine white crystals of the polyacetylenic compound. This element upon exposure to ultraviolet radiation strong in a wavelength emission of 2537 A. undergoes an immediate color change to blue. This element is useful in image-forming applications employing electron beam or ultraviolet radiant energy.

EXAMPLE 7

Monomethyl ester of 10,12-docosadiynedioic acid is ground in water-methanol or water-ethanol, or desirably water-acetone with glass beads at about 15° C. to a fine crystalline particle size. The glass beads are filtered from the resultant finely ground slurry and the slurry dispersed in aqueous gelatin by mixing thoroughly therewith. About a 10-mil thick wet coat of the resulting gelatin-polyacetylenic compound dispersion is coated onto a glass slide and the coating dried to a solid film about ⅓ mil thick in a warm air oven. A second wet coat of the gelatin-polyacetylenic compound dispersion then is applied and this coating also dried to a solid film in the warm air oven, with the total two-coat dry thickness about ⅔ mil.

The resulting element comprises a glass substrate material having adhered thereto two coats of a gelatin binder having dispersed therein fine white crystals of the polyacetylenic compound. Exposure of this element to ultraviolet radiation results in immediate appearance of a blue colored irradiation product. The element also is useful as the image-recording element in electron microscopy and there results a visible blue-colored negative image of the electron microscopic specimen.

EXAMPLE 8

Crystalline dimethyl ester of 11,13-tetracosadiynedioic acid, M.P. 39.5°–40.5° C., is ground by mortar and pestle in a cold room and the resulting finely ground material sprinkled onto the sticky adhesive-coated side of commercially available cellophane tape, such as "Scotch" brand cellophane tape sold for ordinary office use. The coated tape is rubbed with the sprinkled ground material and then shaken and inverted to remove loose material not adhering to the sticky adhesive. The resulting element then comprises a cellophane substrate, a subbing layer of an adhesive coating and fine crystalline polyacetylenic compound adhered to the adhesive coating. The face of the element having the fine crystalline polyacetylenic compound adhered thereto is exposed to ultraviolet radiation from a source predominantly of a principal wavelength emission of 2537 A. whereupon the fine crystalline polyacetylenic compound quickly changes from a white to a deep bluish-violet.

EXAMPLE 9

A small amount of 13,15-octacosadiyne crystals, as prepared a mixture, M.P. of about 40° C., of two apparently different crystalline forms only one form of which appears to possess substantial photosensitivity to ultraviolet radiation, is dissolved in ether and this ether solution employed to saturate a filter paper. The saturated filter paper then is permitted to stand at ambient laboratory conditions until ether evaporates therefrom. Upon exposure of the dried filter paper shortly after its preparation, now containing crystals of diyne adhering to the filter paper, to ultraviolet radiation of a principal wavelength emission of 2537 A., crystalline diyne rapidly changes to a blue color.

A like-prepared saturated filter paper is prepared and aged about one week at ambient laboratory conditions in the absence of visible light and upon exposure to the same ultraviolet radiation source for up to about 1 minute no visible color change is observed. However, if just prior to exposure to ultraviolet of this prepared and stored filter paper one exerted slight pressure as by scratching with a stylus or as by striking with a letter-type face, that portion of the filter paper whereat the scratching or pressure was exerted immediately takes on a deep blue coloration upon subsequent ultraviolet irradiation.

EXAMPLE 10

A small amount of 11,12-tetracosadiyne, a liquid at about 20° C. and having a boiling point of about 170°–190° C. 0.1 mm. Hg is added to liquified paraffin wax, which has been well liquified by warming on a steam bath, and stirred sufficiently to disperse minute globules of the liquid diyne throughout the liquified paraffin. The liquified mixture then is flowed onto a solid surface and cooled to about 0° C. whereabout the paraffin solidifies and the diyne globules crystallize. Upon exposure of this 0° C. cooled composition of paraffin wax and dispersed diyne crystals to ultraviolet radiation, from a source predominantly of a principal wavelength emission of 2537 A., the white diyne crystals change to a deep blue color. Upon permitting the UV exposed composition to warm to about 20°–25° C., the blue-colored irradiation product changes to a red color.

EXAMPLE 11

Theer is added dropwise about 0.45 gram of aqueous 50 percent potassium hydroxide to a mixture of about 4 grams of water and about 1 gram of monomethyl ester of 10,12-docosadiynedioic acid product of an acid number of about 166. The resulting solution is filtered and 1 gram of the filtered solution added with stirring to 0.86 gram of aqueous 20 percent polyvinylpyrrolidone (such as a medium viscosity grade of commercially available polyvinlpyrrolidone). The resulting solution of about 20 percent solids is applied to coat the surface of glass microscope slides and dried. The resulting elements comprise a glass substrate having adhered thereto a dry solid coating comprised of about 47 percent of polyvinylpyrrolidone binder containing dispensed therein about 53 percent of fine crystalline methyl potassium 10,12-docosadiynedioate.

These elements are useful as image-recording elements in electron microscopy to provide a visible blue-colored image of an electron microscopic specimen.

EXAMPLE 12

An acetone solution of monomethyl ester of 10,12-docosadiynedioic acid is added slowly and dropwise into agitated water and then ball milled with ceramic balls for about 12 hours. The balls are removed and the resulting grind placed under vacuum to remove acetone. Five grams of this aqueous 20 percent monomethyl ester of 10,12-docosadiynedioic acid are added with stirring to 5 grams of aqueous 20 percent polyvinyl alcohol (such as a medium viscosity grade of a commercially available 88–90 percent hydrolyzed polyvinyl acetate). A wet coating of the resulting mixture is applied by a Baker blade to a thin film of polyethylene terephthalate and dried in a forced-air oven at about 50° C.

Upon exposure of the resulting element to ultraviolet radiation, crystalline diyne in the polyvinyl alcohol coating changes to a blue color.

EXAMPLE 13

Crystalline monomethyl ester of 10,12-docosadiynedioic acid is ground to fine particles in an aqueous 50 percent methanol solution. The resulting grind is mixed with an aqueous 10 percent water-soluble polymer of ethylene oxide, such as Polyox WSR N-80, solution and stirred for about 30 minutes. This mixture is then ground with glass beads and the resulting ground mixture, after removal of the glass beads, applied as coatings to glass surfaces.

By this procedure and two-coating applications, each about 6–7 mil wet-coating thickness, and with drying at about 50° C. after each coating, there are obtained elements of glass substrates having adhered thereto the polymer binder containing dispersed therein fine crystalline particles of the monomethyl ester of 10,12-docosadiynedioic acid.

These elements upon utilization in image-recording applications in electron microscopy provide visible bluetions employing ultraviolet radiation, there are obtained visible blue-colored images.

EXAMPLE 14

In this example the binder employed is an emulsion copolymer of ethylene and vinyl acetate, sometimes described as an acetoxylated polyethylene because of its essentially linear copolymer structure, having acetoxy groups present on from 20 to 50 percent of the carbon atoms in the chain and a weight-average molecular weight exceeding one million, such as Aircoflex 100. About 0.38 gram of an aqueous 48 percent emulsion of this ethyline-vinyl acetate copolymer is mixed with 0.48 gram of water and the resulting emulsion mixed with about 1 gram of a filtered solution of methyl potassium 10,12-docosadiynedioate, prepared as described in Example 11. A wet coating of the resulting mixture is applied to the surfaces of glass plates and dried at about 50° C. The resulting elements are employed in image-recording applications. Upon exposure to ultraviolet radiation or to the electron beam of the electron microscope the irradiated methyl potassium 10,12-docosadiynedioate crystals in the copolymer binder change to a blue color.

EXAMPLE 15

An acetone solution of monomethyl ester of 10,12-docosadyinedioic acid is mixed with water and ball-milled with ceramic balls. The resulting grind is decanted from the ceramic balls and mixed with aqueous 20 percent polyvinyl alcohol (such as employed in preceding examples). The acetone is stripped therefrom under vacuum. The resulting dispersion of polyyne in the aqueous polyvinyl alcohol solution has a total solids content of abont 20 percent (sum of dispersed polyyne and dissolved polyvinyl alcohol) with about 50 percent of the total solids being the polyyne. To 1.25 grams of this there is mixed 0.1 grams of substantially completely hydrogenated monomethy ester of 10,12-docosadiynedioic acid (i.e., monomethyl ester of docosadioic acid) and films drawn down on glass surfaces and dried at about 50° C.

Upon employment of the resulting element, which comprises a glass surface having adhered thereto a coating of polyvinyl alcohol binder containing therein dispersed polyyne crystals and a small amount of hydrogenated polyyne, in ultraviolet image-recording application, there is obtained a visible image of a blue color. Upon heating the exposed element to about 60°C. for a short time, the blue-colored image changes to a red-colored image. The unexposed portions of this exposed and heated element now are significantly insensitive and at least of greatly reduced sensitivity to additional ultraviolet radiation. Likewise, the red image, i. e., the converted blue image, also is significantly insensitive, so far as visual observation discerns, to additional ultraviolet radiation.

In place of the hydrogenated monomethyl ester of docosadiynedioic acid, there may be employed other hydrogenated polyyne products and a like result of greatly reduced sensitivity of unexposed portions of the element is obtained. Other useful materials in place of the hydrogenated polyyne products include dicyclohexyl phthalate, benzophenone, and, in general, like materials which upon heating solubilize unexposed polyyne and retain the unexposed polyyne in a solubilized state after the heating.

EXAMPLE 16

To an aqueous dispersion of 7,9-hexadecadiynedioic acid there is added aqueous 50 percent potassium hydroxide in an amount sufficient to dissolve the polyyne and to give an aqueous solution of dipotassium 7,9-hexadiynedioate. This aqueous solution of the dipotassium salt is mixed with aqueous polyvinyl alcohol and coated onto a glass surface as described in preceding examples. The resulting element comprises a glass surface having adhered thereto a dried film of polyvinyl alcohol containing dispersed crystals of the dipotassium salt.

A screen is laid over the elements coating and exposure made to ultraviolet radiation. No visible image is observed after this exposure. The exposed element then is immersed in concentrated hydrochloric acid for about 10 seconds and dried at about 50° C. A faint image now is observed and upon exposure of this acid-treated element completely overall to ultraviolet radiation there results a blue-colored positive image of the screen.

In place of hydrochloric acid other strong mineral acids, such as sulfuric acid and the like may be used, and in place of immersion an acid vapor treatment is useful.

EXAMPLE 17

Monomethyl ester of 10,12-docosadiynedioic acid is dissolved in acetone to provide a solution containing about 20 percent by weight of dissolved polyyne compound. This solution is added slowly with rapid agitation to a 20 percent by weight aqueous polyvinyl alcohol solution and acetone vacuum stripped therefrom. The polyvinyl alcohol employed is about 88–90 percent hydrolized polyvinyl acetate, such as commercially available Elvanol 51–05. A resulting dispersed precipitate of the polyyne compound in the polyvinyl alcohol solution is ground with glass beads or until the dispersed particles approximate an average particle size of 5 to 12 microns usually about 5 hours grinding time. The glass beads then are removed from the ground dispersion. Sufficient water is added and mixed therewith to provide a dispersion containing about 10 to 12 percent solids. This dispersion then is applied as a coating to a glass plate and air dried at temperatures not exceeding about 50°–55° C. There results from a 7–10 mil wet coating a photosensitive element comprising a dry coating about ½ mil thick adhering to the glass plate.

EXAMPLE 18

A monomethyl ester of 10,12-docosadiynedioic acid product of acid number of about 155–160 (theoretical acid number of this monomer is about 149 with this product being prepared from its diacid so as to contain both monoester and diacid in an amount providing the product with acid number 155–160) is mixed with its corresponding diacid, 10,12-docosadiynedioic acid in an amount to provide a polyyne product mixture of acid number of about 170. To this mixture in water there is added dilute aqueaous potassium hydroxide in an amount barely in excess of the calculated equivalent to neutralize the mixture and dissolve the major portion of the acetylenic compounds. The resulting neutralized water solution of the potassium salt is filtered and the filtrate is mixed with about 12 percent by weight aqueous polyvinyl alcohol, about 88–90 percent hydrolyzed polyvinyl acetate, such as commercially available Elvanol 51–05. It then is applied as a coating to a glass plate and air dried at about 45° C. The dispersed potassium salt in the dried film approximates particles about 0.5 to 1.5 microns in size. The ratio of potassium salt to polyvinyl alcohol in the applied dispersion is such that the dried coating consists essentially of about 60 percent polyyne potassium salt crystals and 40 precent polyvinyl alcohol. A second coating application of the dispersion is applied and air dried. Thereafter, the resulting image-receptive element consists essentially of the glass plate substrate material and adhered thereto dried clear coatings approximating 0.1 gram per square nich, of polyvinyl alcohol binder containing dispersed therein crystals of methyl potassium 10,12-docosadiynedioate.

In the preceding Example 18, diacid is added to bring the monoester product to an acid number approximating 170 in order to produce a substantially clear polyvinyl alcohol coating. At lower acid numbers and those approaching theoretical for the monoester, the photosensitive potassium salt prepared therefrom results in a polyvinyl alcohol coating which is not clear but is translucent. At acid numbers greater than 170 or those wherein the diacid content exceeds about 7½ percent and more of the polyyne mixture, the photosensitive potassium salt in the resulting dried coating is not as photosensitive to electron beam irradiation as that derived from a lower than 170 acid number monoester product.

In the resulting elements of dried photosensitive films on the glass plate, the polyyne potassium salt loadings can range up to about 75 percent by weight. At higher loadings, insufficient polyvinyl alcohol binder is present to firmly adhere all crystalline particles to the glass plate and some crystals brush off relatively easily. In films of less than ½ mil dry thickness, polyyne potassium salt loadings of the dried film lower than about 40 percent by weight are not desirable in that sufficient photosensitive material is not present to produce an image of suitable density upon a short duration exposure to an electron beam.

Image receptive elements produced in accordance with Example 17 are employed in X-ray imaging applications to directly induce visual print-out images. With a beam of chromium-K-alpha X-radiation at 40 kv. energy for 5 seconds there directly results a visual print-out image. Likewise, iron-K-alpha and other X-radiation sources induce visual print-out images.

Image-receptive elements produced in accordance with Examples 17 and 18 are employed in electron microscopy to directly induce visual print-out images. With a specimen of latex spheres on a carbon support in a Model 6A electron microscope of the Japan Electron Optics Company and a tungsten hot cathode electron source at 80 kilovolts accelerating potential and a beam current of 70–80 $\mu$a. for a 4500X instrument magnification, a suitable exposure setting is about 10 seconds at crossover for the image-receptive element of Example 17 and about 30 seconds at crossover for the image-receptive element of Examples 18. At other than crossover settings, the exposure times are varied accordingly. To illustrate the versatility of the image-receptive elements for image-recording purposes, images are recorded at electron beam accelerating potentials of 50, 80, and 100 kilovolts, with number of different specimens including latex spheres, mica lamella, pork liver sections, potassium iodide crystals, and hampster tissue, and, with image-recording by transmission and diffraction electron microscopic techniques.

The as-produced electron-irradiated imaged elements present directly visible print-out images of a visually distinctly different color than nonirradated areas. Thus, such images readily can be viewed, studied, and examined immediately upon removal of the imaged element from the electron microscope, without development being necessary before visual examination. Examination of the images by optical enlargement techniques at greater than 200× reveals a unique sharpness of border or periphery between imaged and non-imaged areas. An equivalent sharpness is not observable when employing commercially available silver halide emulsion-coated glass plates and customary exposure and development conditions in recording an electron microscopic image of the same specimen. In the comparison of an image of the polyyne-imaged element with a conventional silver image by an optical enlargement technique revealing crystals and grains making up the images, it is noted that the border or periphery between imaged and nonimaged areas of the conventional silver images is relatively ragged and irregular due to whole crystals of silver jutting from and destroying the true imaged border or periphery. In contrast, the border or periphery of the as-produced recorded image on the polyyne-imaged element is of unusual sharpness and detail with such a border or periphery cutting directly across individual crystals of the imaged element to clearly reveal discrete portions of individual crystals disposed in the imaged area which are a visually distinctly different color than portions of individual crystals not disposed in the imaged area and not exposed to the radiation.

A like comparison can be made with a straight-edged opaque object placed to mask a portion of the image-receptive elements of Examples 15 and 16 and the same exposed to ultraviolet radiation. Here too, the directly recorded print-out image is of unique sharpness with an enlarged image revealing that the straight border or periphery between imaged and nonimaged areas of the element cuts across individual discrete crystals of the polyyne compound lying on the path of the image border or periphery. In contrast, with the same straight-edged opaque and light photographic techniques with a silver halide emulsion element for the image recording, there is produced the conventional photographic silver image wherein the border or periphery between imaged and nonimaged areas is jagged, irregular, and deviates from a straight line due to silver crystals extending irregularly outwardly at the border or periphery of the imaged area.

To clearly illustrate the unique sharpness and detail of image border or periphery in the imaged elements, there are grown discrete crystals of monomethyl ester of 10,12-docosadiynedioic acid in ethanol and acetone under controlled conditions of crystal formation. With aid of an optical microscope several crystals of a size about ⅛-inch by ½-inch are hand picked and carefully adhered by clear tape to the surface of a glass microscope slide to position fixedly the individual crystals. A wire screen is placed so as to have wire strands cross several discrete crystals and thus to mask portions of individual crystals. This arrangement then is exposed for about 1–2 seconds to an 80 kv. electron beam. Whereupon the portions of the individual crystals not masked receive radiation and the masked portions receive substantially no radiation. The wire screen then is removed and the radiated and unirradiated portions of the crystals examined visually and with a microscope. It is noted that those portions of the crystals exposed to the radiation are of a visually distinctly different color (in this instance visually a deep blue to purple color), while the masked, unexposed portions of the same crystals are unchanged from their initial unexposed color (in this instance a water-white to a transparent white).

An important property of most of the imaged elements, wherein the image has been produced by ultraviolet or electron beam radiation of the photosensitive crystals of the photosensitive crystalline polyacetylenic composition of matter, is a reasonable stability and lack of photosensitivity to visible light. Thus, the directly produced visual print-out image can be printed out and handled and examined for a reasonable time, up to even days or weeks in some instances, under visual light with little to no resulting color-transformation of the photosensitive crystals in the nonimaged area of the element. This property also makes it possible to employ conventional light photography, as with silver halide photographic techniques, to print out and to make prints and copies, negatives or positives, and enlargements of the image on the imaged elements. A distinct advantage of the element of Example 18 is the clarity of the binder and unexposed crystalline polyyne areas. To print out copies of the image of such an imaged element, it can be employed in substantially the same manner as conventional silver halide produced imaged negatives and films. When the element is of the nature of Example 17 wherein the unexposed crystalline polyyne areas are whitish and tend to be translucent in appearance, desirably for printing out copies by conventional silver halide photographic techniques, one employs various color filters and papers as is known in the art to bring out and accentuate contrast between imaged and nonimaged areas on the produced copies of the image with, for example, a 4–64 Kodak green filter being useful.

A specific advantage of the electron-microscopic polyyne-imaged element arises from its image being capable of optical enlargement to a much greater extent without loss of detail than conventional electron-microscopic silver halide-imaged elements. In electron microscopy a choice of a suitable final magnification must take into acount the finest detail to be examined in the recorded image. The final magnification is the product of the instrument magnification and the photographic optical enlargement of the recorded image. Also, because of a maximum frame size instrument limitation in the ordinary electron microscope, the area of the field of view decreases as the inverse square of the instrument magnification. With the conventional electron-microscopic silver halide-imaged elements, an optical enlargement greater than 10×, usually only 4–5×, is rarely useful because of obscuring or detail by the grain size. Because of such a limited optical enlargement, the instrument magnification must be of such a magnitude to provide the desired final magnification and accordingly a maximum limitation on the area of the field of view is imposed. In contrast, since the polyyne-imaged element is capable of greater optical enlargement (as high as several orders greater without loss of detail, a smaller instrument magnification can be used to provide the equivalent final magnification and significantly a much larger area of field of view be examined and studied.

Where the imaged elements are to be retained for lengthy periods, desirably they are stored, as in an envelope or opaque container, in a manner excluding any stray irradiation of radiant energy of a form photosensitively effecting the element. Alternatively, the initially imaged elements may be fixed or converted to a more stable imaged state. In fixing, the unexposed photosensitive crystalline polyyne is placed in a form where-at it is no longer substantially photosensitive, as by solvating it in the binder, changing it from crystalline to liquid state, or washing it out from the element, and the like. In conversion, the initial irradiation induced color is transformed to another distinctly different color, which is relatively stable as to exposure to the initial form of radiant energy inducing the image formation.

A particularly convenient manner to effect a color transformation of the initially induced image is to carefully heat the imaged element to an appropriate elevated temperature, generally between 5°–20° C. less than the melting point of the nonirradiated crystalline photosensitive polyyne, where-at the initial radiant-energy induced color-transformed crystals and crystal portions transform to another distinctly different visible color. For example, in elements wherein monomethyl ester of 10,12-docosadiynedioic acid or monomethyl ester of 11,13-tetracosadiynediois acid is an employed photosensitive crystalline polyyne, there is preferred a brief exposure of from a few seconds up to about a minute at temperatures intermediate 50° to 60° C., and desirably not exceeding about 60° C., to effect a color transformation to another distinctly different color (i.e., from the initial radiation-induced blue to purple color to a red to reddish-orange color). Other photosensitive crystalline polyynes also have preferred temperatures for this color transformation by heat, with the preferred maximum temperature being less than the melting point of the unirradiated photosensitive crystalline polyyne. Temperatures approximating and higher than the melting point of the unirradiated photosensitive crystalline polyyne will effect a color transformation of the initial radiant-energy induced colored polyyne crystals, but in so doing there may be some loss in sharpness of the image with some blurring and roughing of the image border or periphery. This can be avoided, or at least minimized, if the colored imaged crystal portions and crystals are firmly held at these temperatures in position by the binder and if the imaged crystals are so held as to avoid being overcoated or dissolved in melted unexposed polyyne.

Another manner for effecting color transformation of the blue-colored image is exposure to a solvent for the unexposed polyyne. An exposure for about 10 to 15 seconds at an elevated temperature from about 5° to 10° C. lower than employable for heat fixing generally is satisfactory. Methanol, ethanol, toluene, diethyl ether, butyl acetate, carbon tetrachloride, acetone, 2-butoxyethanol, and like solvents are useful with the element of Example 15, and water vapor and aqueous solution, such as aqueous hydrochloric acid, with the element of Example 16. Other useful solvents also will be apparent.

An advantage of the element, having the image thereof in the other distinctly different color than the radiation-induced colored image, is that this other color may be more susceptible to providing print-out copies with good contrast when prints, negatives, and the like of this image are made by conventional silver halide photographic techniques.

While the invention has been described and specifically illustrated with certain materials and at certain conditions, it is to be understood that various modifications and variations will be obvious therefrom to those skilled in the art, and that all such obvious variations and modifications which fall within the true scope of the invention are intended to be encompassed within the appended claims.

What is claimed is:

1. A photosensitive image-receptive element comprising: a carrier means and, fixedly positioned thereby, photosensitive crystals of a photosensitive crystalline polyacetylenic compound having a minimum of two acetylenic linkages as a conjugated system.

2. The element of claim 1 in which the photosensitive crystals are of a photosensitive crystalline lower alkyl ester of a dicarboxylic-terminated diacetylenic compound which contains from 16 to 26 carbon atoms.

3. The element of claim 1 in which the photosensitive crystals are of a photosensitive crystalline monomethyl ester of 11,13-tetracosadiynedioic acid.

4. The element of claim 1 in which the photosensitive crystals are of a photosensitive crystalline monomethyl ester of 10,12-docosadiynedioic acid.

5. The element of claim 1 in which the photosensitive crystals are of a photosensitive crystalline monoethyl ester of 11,13-tetracosadiynedioic acid.

6. The element of claim 1 in which the photosensitive crystals are of a photosensitive crystalline dimethyl ester of 11,13-tetracosadiynedioic acid.

7. The element of claim 1 in which the carrier means includes a binder material substantially transmissive of radiant energy inducing a photosensitive response in the photosensitive crystals.

8. The element of claim 1 in which the carrier means includes a supporting sheet.

9. The element of claim 8 in which the supporting sheet is polyethylene terephthalate.

10. The element of claim 8 in which the supporting sheet is glass.

11. The element of claim 8 in which the supporting sheet is paper.

12. A process for formation of a visual print-out image through employment of an image-receptive element comprised of carrier means fixedly positioning crystals of a polyacetylenic hydrocarbon compound having a minimum of two acetylenic linkages as a conjugated system, which process comprises:

(a) storing said element in the absence of visible light until visually nonsensitive to a radiant energy exposure up to about 1 minute;
(b) exerting pressure in the pattern of the image to be created upon said crystals; and
(c) immediately thereafter overall exposing said element to radiant energy of an exposure duration less than one minute;

whereby a visual print-out image is provided by a color change being induced in those crystals upon which pressure was exerted.

13. The process of claim 12 employing the image-receptive element comprised of carrier means fixedly positioning crystals of 13,15-octacosadiyne.

References Cited

Jones et al., "Synthesis of Polyacetylenic Compounds in Nature," vol. 168, pp. 900–903, Nov. 24, 1951.

NORMAN G. TORCHIN, Primary Examiner

R. E. FICHTER, Assistant Examiner

U.S. Cl. X.R.

96—48; 250—65, 65.1

PO-1050
(5/69)

UNITED STATES PATENT OFFICE
CERTIFICATE OF CORRECTION

Patent No. 3,501,302 Dated March 17, 1970

Inventor(s) Rodger L. Foltz

It is certified that error appears in the above-identified patent and that said Letters Patent are hereby corrected as shown below:

Column 2, line 34, the formula should appear as follows:
$-C\equiv C-C\equiv C-$ Column 3, line 18, "Seber" should read --Seher--.
Column 10, line 31, "acetyl" should read --acetylide--.
Column 12, lines 17 to 19, the formula should appear as follows:

$$-\overset{|}{\underset{|}{C}}-CH_2-\overset{|}{\underset{|}{C}}-$$

Column 15, line 11, "monoethpl" should read --monoethyl--.
Column 18, about line 17, "Monoeopentyl" should read --Mononeopentyl--.
Column 24, line 32, "Theer" should read --There--.
Column 25, intermediate lines 13 and 14, insert --colored images. Likewise, in image-recording applica- --; line 27, "ethyline-vinyl" should read --ethylene-vinyl--.
Column 26, line 55, "monomer" should read --monoester--.
Column 27, line 6, "nich" should read --inch--.
Column 29, line 36, the left parenthesis mark, "(" should be a comma --,--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents